United States Patent
Shiobara et al.

(10) Patent No.: US 8,759,456 B2
(45) Date of Patent: Jun. 24, 2014

(54) ADDITION REACTION-CURABLE ORGANOPOLYSILMETHYLENESILOXANE COPOLYMER COMPOSITION

(75) Inventors: Toshio Shiobara, Tokyo (JP); Tsutomu Kashiwagi, Annaka (JP); Takeshi Fukuda, Niigata (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/405,588

(22) Filed: Feb. 27, 2012

(65) Prior Publication Data

US 2012/0220722 A1 Aug. 30, 2012

(30) Foreign Application Priority Data

Feb. 28, 2011 (JP) ................. 2011-042758

(51) Int. Cl.
*C08G 77/50* (2006.01)
*C08L 83/10* (2006.01)
*C08L 83/14* (2006.01)

(52) U.S. Cl.
CPC ............. *C08G 77/50* (2013.01); *C08L 83/10* (2013.01); *C08L 83/14* (2013.01)
USPC ................. 525/478; 528/34; 528/35

(58) Field of Classification Search
CPC ....................................... C08G 77/50
USPC ...................... 525/478; 528/34, 35
See application file for complete search history.

(56) References Cited

U.S. PATENT DOCUMENTS

| | | | |
|---|---|---|---|
| 3,969,310 A * | 7/1976 | Itoh et al. ............ | 524/862 |
| 5,763,540 A | 6/1998 | Nakata et al. | |
| 6,492,480 B1 * | 12/2002 | Nagashima et al. ........ | 528/19 |
| 6,534,587 B1 * | 3/2003 | Tapsak et al. ............ | 524/588 |
| 8,173,759 B2 * | 5/2012 | Kashiwagi et al. ........ | 528/35 |
| 8,586,690 B2 * | 11/2013 | Gubbels et al. ........... | 528/37 |
| 2011/0046310 A1 * | 2/2011 | Kashiwagi et al. ........ | 525/192 |
| 2011/0046319 A1 * | 2/2011 | Ueno et al. ............... | 525/477 |
| 2011/0077364 A1 * | 3/2011 | Tazaki et al. ............. | 525/477 |
| 2012/0220722 A1 * | 8/2012 | Shiobara et al. .......... | 525/100 |

FOREIGN PATENT DOCUMENTS

| | | |
|---|---|---|
| JP | 5-320350 A | 12/1993 |
| JP | 8-109264 A | 4/1996 |
| JP | 8-109265 A | 4/1996 |
| JP | 8-109266 A | 4/1996 |
| JP | 9-227781 A | 9/1997 |
| JP | 9-227782 A | 9/1997 |
| JP | 9-227783 A | 9/1997 |
| JP | 3069655 B2 | 7/2000 |
| WO | WO 01/30887 A1 | 5/2001 |

* cited by examiner

*Primary Examiner* — Mike M Dollinger
(74) *Attorney, Agent, or Firm* — Birch, Stewart, Kolasch & Birch, LLP

(57) ABSTRACT

Disclosed is an addition reaction-curable organopolysilmethylenesiloxane copolymer composition including: (A) an organopolysilmethylenesiloxane copolymer represented by formula (a) shown below:

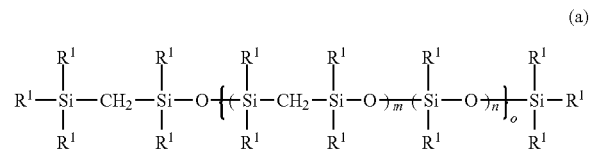

(a)

which has in one molecule at least two alkenyl groups bonding to silicon atoms; (B) an organopolysiloxane represented by formula (b) shown below:

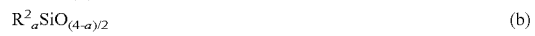

$R^2{}_a SiO_{(4-a)/2}$ (b)

which has in one molecule at least two alkenyl groups bonding to silicon atoms; (C) an organohydrogenpolysilmethylenesiloxane and/or organohydrogenpolysiloxane; and (D) a platinum group metal-based catalyst.

The copolymer composition excels in heat resistance, electrical insulation, mechanical strength, and optical properties, and exhibits good water resistance, hydrolysis resistance and gas barrier properties under severe use conditions without suffering gas permeability and poor chemical resistance inherent in silicone rubber.

10 Claims, No Drawings

ADDITION REACTION-CURABLE ORGANOPOLYSILMETHYLENESILOXANE COPOLYMER COMPOSITION

CROSS-REFERENCE TO RELATED APPLICATION

This non-provisional application claims priority under 35 U.S.C. §119(a) on Patent Application No. 2011-042758 filed in Japan on Feb. 28, 2011, the entire contents of which are hereby incorporated by reference.

TECHNICAL FIELD

The present invention relates to an addition reaction-curable organopolysilmethylenesiloxane copolymer composition imparts a cured product being excellent in heat resistance, mechanical strength, electrical insulation, electrical properties, chemical resistance, and water resistance.

BACKGROUND ART

There are well-known curable silicone rubber compositions which turn into silicone elastomers upon curing. Owing to their excellent weather resistance, heat resistance, and electrical insulating properties, they find general use as electric and electronic parts, electric wire coating, and automotive parts, whose typical examples include gasket material, potting material, coating material, roll material, and casting material for mold making.

However, they do not exhibit the silicone's outstanding properties, including chemical resistance (such as acid resistance and alkali resistance), water resistance, and gas permeability, under extremely severe conditions at high temperatures with high humidity, on account of the siloxane bond (which is the ionic bond) characteristic of the silicone.

New developments to cope with the foregoing disadvantage include polymers in which the siloxane bond is partly replaced by the silethylene bond or the silphenylene bond, as disclosed respectively in Patent Document 1 (WO 2001/030887) and Patent Document 2 (JP-A H05-320350). These polymers, however, have not yet been commercialized except for special uses and fields because of their difficulties in synthesis, problems with mass production, and high production cost.

It is known that a polydiarylsilmethylenesiloxane having the silmethylenesiloxane bond can be used as a precursor of silicon carbide-based ceramics, as disclosed in Patent Documents 3 to 5, JP-A H08-109264, JP-A H08-109265, and JP-A H08-109266. This polymer is a high-melting crystalline thermoplastic silicone polymer. It is excellent in heat resistance, insulation, electrical properties, chemical resistance, and water resistance but is poor in processability and moldability for practical use. Attempts have been made for its improvement through incorporation with a silicone polymer or incorporation with polydiarylsilmethylenesiloxane and polyalkylsilmethylenesiloxne, as disclosed respectively in Patent Document 6, JP-A H09-227781, and Patent Documents 7 and 8, JP-A H09-227782 and JP-A H09-227783. There is known a method for forming a film of polysilmethylenesiloxane on a substrate from a film of disilacyclobutane by ring opening polymerization with the help of a film of metal fine particles, as disclosed in Patent Document 9, Japanese Patent No. 3069655. However, the polydiarylsilmethylenesiloxane is a high-crystalline thermoplastic polymer but is not available in the form of thermosetting composition with the characteristic properties of polymer because of its difficulties in synthesis, high price and poor processability even though it was expected to be useful as a precursor for silicon carbide ceramics.

SUMMARY OF THE INVENTION

The present invention was completed in view of the foregoing. It is an object of the present invention to provide an addition reaction-curable organopolysilmethylenesiloxane copolymer composition which can impart a cured product having excellent properties not only in such characteristic properties as heat resistance, electrical insulation, chemical resistance, and water resistance but also in optical properties (such as permeability and high refractive index), processability and moldability, and gas barrier properties (such as gas permeability), the composition containing a silicon-based polymer having the silmethylenesiloxane copolymer bond.

The present inventors conducted extensive researches which led to the finding that the aforementioned object is achieved with an addition reaction-curable organopolysilmethylenesiloxane copolymer composition composed of an organopolysilmethylenesiloxane copolymer having in one molecule at least two alkenyl groups (for addition reaction) bonding to silicon atoms or a mixture thereof with an organopolysiloxane having in one molecule at least two alkenyl groups (for addition reaction) bonding to silicon atoms, an organohydrogenpolysilmethylenesiloxane having at least two hydrogen atoms bonding to silicon atoms and/or organohydrogenpolysiloxane, and a platinum group metal-based catalyst. The present invention is based on this finding.

The addition reaction-curable organopolysilmethylenesiloxane copolymer composition according to the present invention is defined as follows.

[1] An addition reaction-curable organopolysilmethylenesiloxane copolymer composition comprising:

(A) an organopolysilmethylenesiloxane copolymer in an amount of 1 to 100% by weight, which is represented by formula (a) shown below:

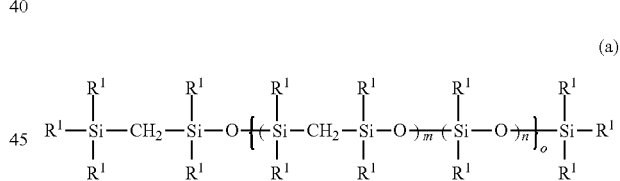

wherein $R^1$ is independently selected from an unsubstituted or substituted monovalent hydrocarbon group with a carbon number of 1 to 10, alkoxyl group, hydroxyl group, halogen atom, $(R^{01})_3SiCH_2-$, and $(R^{01})_3SiO-$ in which $R^{01}$ is independently selected from an unsubstituted or substituted monovalent hydrocarbon group with a carbon number of 1 to 10, and m is 1 to 100, n is 3 to 1,000, and o is 1 to 20, the organopolysilmethylenesiloxane copolymer having in one molecule at least two alkenyl groups bonding to silicon atoms;

(B) an organopolysiloxane in an amount of 0 to 99% by weight, which is represented by the average compositional formula (b) shown below:

wherein $R^2$ is independently selected from an unsubstituted or substituted monovalent hydrocarbon group with a carbon number of 1 to 10, alkoxyl group, hydroxyl group, and halogen atom, and a is a number satisfying $0.7 \leq a \leq 3.0$, the organopolysiloxane having in one molecule at least two alkenyl groups bonding to silicon atoms;

the total amount of components (A) and (B) being 100% by weight, (C) an organohydrogenpolysilmethylenesiloxane and/or organohydrogenpolysiloxane as a crosslinking agent which has in one molecule at least two hydrogen atoms bonding to silicon atoms, said crosslinking agent being in such an amount that the hydrogen atoms bonding to silicon atoms in this component (C) accounts for 0.1 to 5.0 mol per mol of all alkenyl groups in the addition reaction-curable organopolysilmethylenesiloxane copolymer composition; and (D) a platinum group metal-based catalyst in an effective amount.

[2] The addition reaction-curable organopolysilmethylenesiloxane copolymer composition of [1], wherein formula (a) representing the component (A) is defined such that each of $R^1$ is one which is independently selected from an unsubstituted or substituted monovalent hydrocarbon group with a carbon number of 1 to 10, $(R^{O1})_3SiCH_2$—, and $(R^{O1})_3SiO$— in which $R^{O1}$ is defined in [1].

[3] The addition reaction-curable organopolysilmethylenesiloxane copolymer composition of [1] or [2], wherein the crosslinking agent as the component (C) is one which is selected from:

(C1) an organohydrogenpolysilmethylenesiloxane represented by formula (c1) shown below:

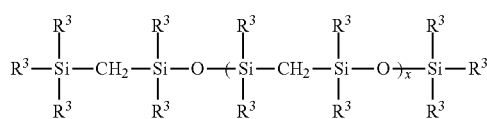

(c1)

wherein $R^3$ is independently selected from a monovalent hydrocarbon group with a carbon number of 1 to 10, hydrogen atom, $(R^{O3})_3SiCH_2$— group, and $(R^{O3})_3SiO$— group in which $R^{O3}$ is independently selected from a monovalent hydrocarbon group with a carbon number of 1 to 10, and x is 0 to 100, the organohydrogenpolysilmethylenesiloxane having in one molecule at least two hydrogen atoms bonding to silicon atoms; and (C2) an organohydrogenpolysiloxane represented by the average compositional formula (c2) shown below:

(c2)

wherein $R^4$ is independently selected from a monovalent hydrocarbon group with a carbon number of 1 to 10, hydrogen atom, alkoxyl group, hydroxyl group, and halogen atom, and b and c are positive numbers satisfying $0.7 \leq b \leq 2.1$, $0.001 \leq c \leq 1.0$, and $0.8 \leq b+c \leq 3.0$, the organohydrogenpolysiloxane having in one molecule at least two hydrogen atoms bonding to silicon atoms.

[4] The addition reaction-curable organopolysilmethylenesiloxane copolymer composition of [3], wherein the component (C2) is an organohydrogenpolysiloxane represented by formula (c2') shown below:

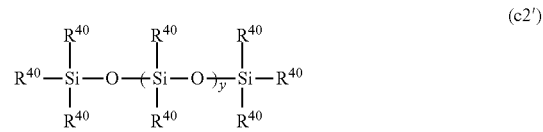

(c2')

wherein $R^{40}$ denotes a monovalent hydrocarbon group with a carbon number of 1 to 6, hydrogen atom, alkoxyl group, hydroxyl group, halogen atom, and $(R^{O40})_3SiO$— in which $R^{O40}$ is independently selected from a monovalent hydrocarbon group with a carbon number of 1 to 6, and y is 0 to 50, the organohydrogenpolysiloxane having in one molecule at least two hydrogen atoms bonding to silicon atoms.

[5] The addition reaction-curable organopolysilmethylenesiloxane copolymer composition of [1], comprising:

(A) an organopolysilmethylenesiloxane copolymer in an amount of 60 to 100% by weight, which is represented by formula (a') shown below:

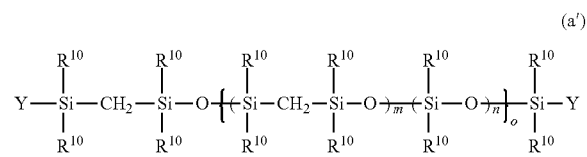

(a')

wherein $R^{10}$ is selected from $Y(CH_3)_2SiCH_2$— and $Y(CH_3)_2SiO$—, with

Y being a vinyl group, m is 1 to 100, n is 3 to 1,000, and o is 1 to 20, the organopolysilmethylenesiloxane copolymer having in one molecule at least two vinyl groups bonding to silicon atoms;

(B) an organopolysiloxane in an amount of 0 to 40% by weight, which is represented by the average compositional formula (b) shown below:

(b)

wherein $R^2$ is independently selected from an unsubstituted or substituted monovalent hydrocarbon group with a carbon number of 1 to 10, alkoxyl group, hydroxyl group, and halogen atom, and a is a number satisfying $0.7 \leq a \leq 3.0$, the organopolysiloxane having in one molecule at least two vinyl groups bonding to silicon atoms;

the total amount of components (A) and (B) being 100% by weight, (C) an organohydrogenpolysilmethylenesiloxane and/or organohydrogenpolysiloxane selected from:

(C1) an organohydrogenpolysilmethylenesiloxane which is represented by formula (c1) shown below:

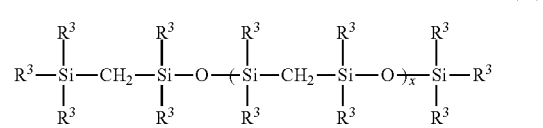

(c1)

wherein R³ is independently selected from a monovalent hydrocarbon group with a carbon number of 1 to 10, hydrogen atom, $(R^{03})_3SiCH_2$— group, and $(R^{03})_3SiO$— group in which $R^{03}$ is independently selected from a monovalent hydrocarbon group with a carbon number of 1 to 10, and x is 0 to 100, the organohydrogenpolysilmethylenesiloxane having in one molecule at least two hydrogen atoms bonding to silicon atoms; and (C2) an organohydrogenpolysiloxane which is represented by formula (c2') shown below:

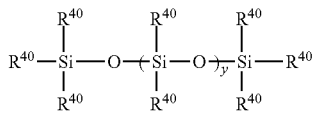

(c2')

wherein $R^{40}$ is independently selected from a monovalent hydrocarbon group with a carbon number of 1 to 6, hydrogen atom, alkoxyl group, hydroxyl group, halogen atom, and) $(R^{040})_3SiO$— in which $R^{040}$ is independently selected from a monovalent hydrocarbon group with a carbon number of 1 to 6, and y is 0 to 50, the organohydrogenpolysiloxane having in one molecule at least two hydrogen atoms bonding to the silicon atom, said components (C1) and/or (C2) being in such an amount that the hydrogen atoms bonding to silicon atoms in this component (C) accounts for 0.1 to 5.0 mol per mol of all alkenyl groups in the addition reaction-curable organopolysilmethylenesiloxane copolymer composition; and (D) a platinum group metal-based catalyst in an effective amount.

ADVANTAGEOUS EFFECTS OF THE INVENTION

The addition reaction-curable organopolysilmethylenesiloxane copolymer composition according to the present invention gives a cured product exhibiting outstanding heat resistance, electrical insulation, mechanical strength, and optical properties, and the cured product also excels in water resistance under severe use conditions, hydrolysis resistance, and gas barrier properties (without suffering gas permeability and poor chemical resistance inherent in ordinary silicone rubber). The composition has as good processability and moldability as conventional silicone rubber and can be handled with existing machines such as a molding machine.

In addition, the addition reaction-curable organopolysilmethylenesiloxane copolymer composition according to the present invention gives rise to molded products which can be applied to, electric and electronic parts (such as insulation materials, sealing materials, cables, packings, and connectors), automotive parts, and semiconductor devices, as in the case of silicone rubber. They also find use as lenses and transparent sealing materials owing to their outstanding optical properties.

DESCRIPTION OF THE EMBODIMENTS

The following is a detailed description of the present invention.

The present invention relates to an addition reaction-curable organopolysilmethylenesiloxane copolymer composition.

(A) Organopolysilmethylenesiloxane Copolymer

The component (A) is the primary constituent (or base polymer) of the addition reaction-curable organopolysilmethylenesiloxane copolymer composition. It is an organopolysilmethylenesiloxane copolymer which has in one molecule at least two alkenyl groups bonding to silicon atoms, as represented by the formula (a) shown below:

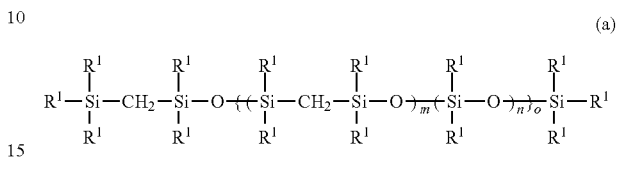

(a)

wherein $R^1$ is independently selected from an unsubstituted or substituted monovalent hydrocarbon group with a carbon number of 1 to 10, preferably 1 to 6, alkoxyl group, hydroxyl group, halogen atom, $(R^{01})_3SiCH_2$—, and $(R^{01})_3SiO$— in which $R^{01}$ is independently selected from an unsubstituted or substituted monovalent hydrocarbon group with a carbon number of 1 to 10, preferably 1 to 6; and m is 1 to 100, n is 3 to 1,000, and o is 1 to 20.

Examples of $R^1$ and $R^{01}$ include alkyl groups, such as methyl group, ethyl group, propyl group, isopropyl group, butyl group, and tert-butyl group; cycloalkyl groups, such as cyclohexyl group; alkenyl groups, such as vinyl group and allyl group; aryl groups, such as phenyl group and tolyl group; aralkyl groups, such as benzyl group and 2-phenylethyl group; such groups as chloromethyl group, 3-chloropropyl group, 3,3,3-trifluoropropyl group, and 2-cyanoethyl group, which are formed from the foregoing groups by partial or entire substitution of hydrogen atoms bonding to silicon atoms by halogen atoms or cyano groups. $R^1$ also includes alkoxyl groups such as methoxy group and ethoxy group, hydroxyl groups, and halogen atoms such as chlorine and fluorine.

Since the organopolysilmethylenesiloxane copolymer has at least two alkenyl groups bonding to silicon atoms, it necessarily contains vinyl groups or allyl groups. The one having vinyl groups is desirable from the standpoint of easy synthesis and heat resistance. Other preferable organic groups include methyl group and phenyl group. Methyl group is especially desirable because it imparts good curing properties and flexibility to the composition. It is desirable that methyl groups account for at least 50 mol % of the groups represented by $R^1$. Incidentally, it is desirable that the amount of alkoxyl groups, hydroxyl groups, and halogen atoms be up to 5 mol %, preferably up to 3 mol %.

The organopolysilmethylenesiloxane copolymer represented by the formula (a) above should preferably be one which is represented by the formula (a') shown below:

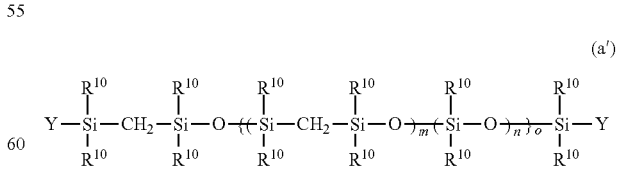

(a')

wherein $R^{10}$ is selected from methyl group, $Y(CH_3)_2SiCH_2$— and $Y(CH_3)_2SiO$— where Y is a vinyl group; and m is 1 to 100, n is 3 to 1,000, and o is 1 to 20.

The value of m, which is the degree of polymerization, should preferably be 30 to 100, more preferably 50 to 100.

The higher the degree of polymerization, the better the resulting composition in high strength, gas barrier properties, water resistance, and high refractive indices, which are attributable to the silmethylene bond.

The value of n, which is the degree of polymerization, should preferably be 3 to 1,000, more preferably 3 to 300, and most desirably 3 to 100, because the higher the degree of polymerization, the lower the ratio of silmethylene bonds in the copolymer.

The value of o, which is an index for the number of repeating units represented by m and n. If the value of o is 1, the copolymer is a block polymer. If the degree of polymerization is within the optimum range specified above, the value of o should preferably be 5 to 15, depending on the degree of polymerization indicated by m and n.

The component (A) should have a viscosity of 30 to 10,000,000 mm²/s, preferably 100 to 10,000,000 mm²/s, measured with an Ostwald viscometer at 25° C.

The organopolysilmethylenesiloxane copolymer containing alkenyl groups may be synthesized, for example, by the following process, which employs those compounds represented by the formulas below in which Me denotes a methyl group and Vi denotes a vinyl group (this shall apply hereinafter).

Cohydrolysis of a silmethylene monomer containing methoxy groups [MeO(Me)₂SiCH₂Si(Me)₂OMe] and a silane or siloxane containing methoxy groups [MeO(SiMe₂O)$_k$Si(Me)₂OMe], with k being 0 to 1,000, in the presence of an acid such as hydrochloric acid is carried out. Similarly, cohydrolysis of a silmethylene monomer containing chlorine atoms [Cl(Me)₂SiCH₂Si(Me)₂Cl] and a chlorosilane or a siloxane containing terminal chlorine atoms [Cl(SiMe₂O)$_k$Si(Me)₂Cl], with k being 0 to 1,000 under an acidic condition is carried out. The product of cohydrolysis is made into a copolymer. The resulting copolymer has its terminals capped with 1,1,3,3-tetramethyl-1,3-vinyldisiloxane and vinyl groups with the help of an alkaline polymerization catalyst (KOH). In this way there is obtained the organopolysilmethylenesiloxane copolymer containing alkenyl groups as the desired product.

An alternative way is by hydrolysis of a silmethylene monomer containing methoxy groups [MeO(Me)₂SiCH₂Si(Me)₂OMe] alone in the presence of an acid such as hydrochloric acid or by hydrolysis of a silmethylene monomer containing chlorine atoms [Cl(Me)₂Si(Me)₂Cl] alone under an acidic condition in the same way, which is followed by neutralization for synthesis of a silmethylene polymer. The resulting silmethylene polymer has its terminals capped with 1,1,3,3-tetramethyl-1,3-vinyldisiloxane (as a source of vinyl groups to be introduced). The capped polymer is copolymerized with a dimethyl cyclic compound as a component of copolymer with the help of an alkaline polymerization catalyst (KOH). In this way there is obtained the organopolysilmethylenesiloxane copolymer containing alkenyl groups as the desired product.

(B) Organopolysiloxane

The component (B) is the secondary constituent to be added to the primary constituent (or base polymer) of the addition reaction-curable organopolysilmethylenesiloxane copolymer composition. It is an organopolysiloxane which has in one molecule at least two alkenyl groups bonding to silicon atoms, as represented by the average compositional formula (b) shown below:

$$R^2{}_a SiO_{(4-a)/2} \quad (b)$$

wherein R² is independently selected from an unsubstituted or substituted monovalent hydrocarbon group with a carbon number of 1 to 10, alkoxyl group, hydroxyl group, and halogen atom; and a is a number satisfying 0.7≤a≤3.0.

The component (B) is not specifically restricted in molecular structure; it may take on the linear, branched, or three-dimensional network (resin-like) structure. In the case of linear structure, the alkenyl group may bond to the silicon atom either at the terminal of the molecular chain or at any other part excluding the terminal of the molecular chain, or at both. The organopolysiloxane should preferably be liquid at room temperature (25° C.) so that it can be used conveniently.

Preferably, among the linear and branched polymers represented by the formula (b) above is the organopolysiloxane resin represented by the formula (b') shown below:

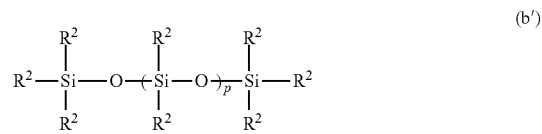

(b')

wherein R² is independently selected from an unsubstituted or substituted monovalent hydrocarbon group with a carbon number of 1 to 10, alkoxyl group, hydroxyl group, and halogen atom; and p is 0 to 100.

The organopolysiloxane resin has in one molecule at least two vinyl groups bonding to the silicon atoms.

R² includes, for example, alkyl groups, such as methyl group, ethyl group, propyl group, isopropyl group, butyl group, and tert-butyl group; cycloalkyl groups, such as cyclohexyl group; alkenyl groups, such as vinyl group and allyl group; aryl groups, such as phenyl group and tolyl group; aralkyl groups, such as benzyl group and 2-phenylethyl group; such groups as chloromethyl group, 3-chloropropyl group, 3,3,3-trifluoropropyl group, and 2-cyanoethyl group, which are formed from the foregoing groups by partial or entire substitution of hydrogen atoms bonding to the silicon atoms by halogen atoms or cyano groups; and alkoxyl groups, hydroxyl groups, and halogen atoms. The organopolysiloxane has at least two alkenyl groups bonding to silicon atoms and consequently it necessarily contains vinyl groups or allyl groups. The one having vinyl groups is desirable from the standpoint of easy synthesis and heat resistance. Other desirable organic groups include methyl group and phenyl group. The methyl group is especially desirable because it imparts good curing properties and flexibility to a compatible component with the component (A) and curability and flexibility; in this case, methyl groups should account for at least 50 mol % in the total amount of R². Preferable among those of linear type are polydimethylsiloxane having the terminals of its molecular chain blocked with dimethylvinyl groups and polydimethylsiloxane-methylphenylsiloxane copolymer having the terminals of its molecular chain blocked with dimethylvinyl groups. Incidentally, it is desirable that alkoxyl groups such as methoxy group and ethoxy group, hydroxyl groups, and halogen atoms such as chlorine and fluorine account for up to 5 mol %, particularly up to 2 mol %, in the total amount of R².

Preferable among the organopolysiloxanes of resin type are copolymers composed of (Me)₂ViSiO$_{1/2}$ units, (Me)₃SiO$_{1/2}$ units, and SiO$_{4/2}$ units, copolymers composed of (Me)₂ViSiO$_{1/2}$ units, and SiO$_{4/2}$ units, and copolymers composed of (Me)₂ViSiO$_{1/2}$ units, SiO$_{4/2}$ units, and (C₆H₅)₃SiO$_{1/2}$ units.

The components (A) and (B) should be mixed in such a ratio that the former accounts for 1 to 100% by weight, preferably 60 to 100% by weight, and the latter accounts for 99 to 0% by weight, preferably 40 to 0% by weight, with the total amount being 100% by weight. If the amount of the component (A) is up to 1% by weight, the resulting composition does not exhibit its good chemical resistance, water resistance, and optical properties characteristic of the organopolysilmethylenesiloxane copolymer. The desirable amount is at least 60% by weight, especially at least 70% by weight.

(C) Crosslinking Agent

The component (C), which is a crosslinking agent, is intended to form crosslinking bonds through addition reaction between the component (A), which is an organopolysilmethylenesiloxane copolymer, and the component (B), which is an organopolysiloxane, with the help of the component (D), which is a platinum group metal-based catalyst. The resulting product is a rubber elastomer of three-dimensional network structure.

The component (C) is selected from organohydrogenpolysilmethylenesiloxane and/or organohydrogenpolysiloxane both having in one molecule at least two hydrogen atoms bonding to silicon atoms. It is represented by the formulas (c1) and (c2) below.

(C1) Organohydrogenpolysilmethylenesiloxane which has in one molecule at least two hydrogen atoms (Si—H group) bonding to silicon atoms as represented by the formula (c1) shown below:

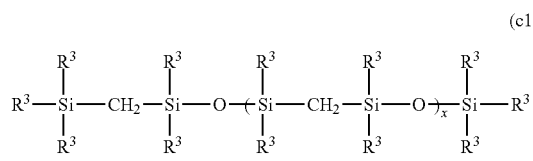

(c1)

wherein $R^3$ is independently selected from monovalent hydrocarbon groups with a carbon number of 1 to 10, preferably 1 to 6, hydrogen atom, $(R^{03})_3SiCH_2$— group, and $(R^{03})_3SiO$— group in which $R^{03}$ is independently selected from a monovalent hydrocarbon group with a carbon number of 1 to 10; and x is 0 to 100.

(C2) Organohydrogenpolysiloxane which has in one molecule at least two hydrogen atoms bonding to silicon atoms as represented by the average compositional formula (c2) shown below:

$R^4_b H_c SiO_{(4-b-c)/2}$ (c2)

wherein $R^4$ is independently selected from monovalent hydrocarbon groups with a carbon number of 1 to 10, preferably 1 to 6, hydrogen atom, alkoxyl group, hydroxyl group, and halogen atom; and b and c are positive numbers satisfying $0.7 \leq b \leq 2.1$, $0.001 \leq c \leq 1.0$, and $0.8 \leq b+c \leq 3.0$, preferably $1.0 \leq b \leq 2.0$, $0.01 \leq c \leq 1.0$, and $1.5 \leq b+c \leq 2.5$.

Incidentally, although examples of $R^3$, $R^{03}$ and $R^4$ may be identical with those of $R^1$, those which do not contain aliphatic unsaturated bonds are preferable.

Also, it is desirable that alkoxyl groups, hydroxyl groups, and halogen atoms represented by $R^4$ (and $R^{40}$ to be given later) should account for up to 5 mol %, preferably up to 2 mol %, in the total amount of $R^4$.

The organohydrogenpolysiloxane represented by the average compositional formula (c2) includes the following examples.

1,1,3,3-tetramethyldisiloxane,
1,3,5,7-tetramethylcyclotetrasiloxane,
tris(hydrogendimethylsiloxy)methylsilane,
tris(hydrogendimethylsiloxy)phenylsilane,
methylhydrogencyclopolysiloxane,
methylhydrogensiloxane-dimethylsiloxane cyclic copolymer,
methylhydrogenpolysiloxane with both ends blocked with trimethylsiloxy groups,
dimethylsiloxane-methylhydrogensiloxane copolymer with both ends blocked with trimethylsiloxy groups,
dimethylpolysiloxane with both ends blocked with dimethylhydrogensiloxy groups,
dimethylsiloxane-methylhydrogensiloxane copolymer with both ends blocked with dimethylhydrogensiloxy groups,
methylhydrogensiloxane-diphenylsiloxane copolymer with both ends blocked with trimethylsiloxy groups,
methylhydrogensiloxane-diphenylsiloxane-dimethylsiloxane copolymer with both ends blocked with trimethylsiloxy groups,
methylhydrogensiloxane-methylphenylsiloxane-dimethylsiloxane copolymer with both ends blocked with trimethylsiloxy groups,
methylhydrogensiloxane-dimethylsiloxane-diphenylsiloxane copolymer with both ends blocked with dimethylhydrogensiloxy groups,
methylhydrogensiloxane-dimethylsiloxane-methylphenylsiloxane copolymer with both ends blocked with dimethylhydrogensiloxy groups,
copolymer composed of $(CH_3)_2HSiO_{1/2}$ units, $(CH_3)_3SiO_{1/2}$ units, and $SiO_{4/2}$ units,
copolymer composed of $(CH_3)_2HSiO_{1/2}$ units and $SiO_{4/2}$ units, and
copolymer composed of $(CH_3)_2HSiO_{1/2}$ units, $SiO_{4/2}$ units, and $(C_6H_5)_3SiO_{1/2}$ units.

The organohydrogenpolysiloxane represented by the formula (c2) above should preferably be those represented by the formula (c2') shown below:

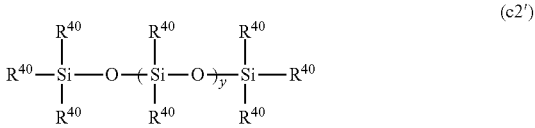

(c2')

wherein $R^{40}$ is independently selected from a monovalent hydrocarbon group with a carbon number of 1 to 6, hydrogen atom, alkoxyl group, hydroxyl group, halogen atom, and $(R^{040})_3SiO$— in which $R^{040}$ is independently selected from a monovalent hydrocarbon group with a carbon number of 1 to 6; and y is 0 to 50.

The component (C), which is organohydrogenpolysilmethylenesiloxane and/or organohydrogenpolysiloxane, contains at least two hydrogen atoms (Si—H groups) bonding to silicon atoms (usually 2 to 200), preferably at least three hydrogen atoms (usually 3 to 100). The component (C) reacts with the component (A) and/or the component (B), thereby functioning as a crosslinking agent.

The component (C) is not specifically restricted in molecular structure; it may take on the linear, cyclic, branched, or three-dimensional network (resin-like) structure. In the case of linear structure, it may have the Si—H group bonding to the silicon atom either at the end of the molecular chain or at the part which is not the end of the molecular chain, or both. It usually has a degree of polymerization of 2 to 200, preferably 3 to 100, in terns of the number of silicon atoms in one molecule. It should preferably be organohydrogenpolysilmethylenesiloxane and/or organohydrogenpolysiloxane which is liquid at room temperature (25° C.).

The component (C) should be added in such an amount that the amount of Si—H groups in it is 0.1 to 5.0 mol, preferably 0.5 to 3.0 mol, more preferably 0.8 to 2.0 mol, for 1 mol of all alkenyl groups bonding to the silicon atoms in the addition reaction-curable organopolysilmethylenesiloxane copolymer composition. Moreover, the amount of alkenyl groups bonding to the silicon atoms in the component (A) should account for 50 to 100 mol %, preferably 80 to 100 mol %, in all alkenyl groups in the addition reaction-curable organopolysilmethylenesiloxane copolymer composition.

If the amount of the component (C) decreases to such an extent that the amount of Si—H groups in it is less than 0.1 mol, the composition of the present invention merely gives a cured product which has an excessively low degree of crosslink density, which leads to poor mechanical strength and poor heat resistance. On the other hand, if the amount of the component (C) increases to such an extent that the amount of Si—H groups in it exceeds 5.0 mol, the composition of the present invention gives a cured product which suffers foaming due to dehydrogenation reaction, which leads to poor mold release properties, poor heat resistance, and change in physical properties with time due to residual Si—H groups.

(D) Platinum Group Metal-Based Catalyst

The component (D), which is a platinum group metal-based catalyst, is intended to promote the addition cure reaction (hydrosilylation) between the primary constituent of the component (A) or a mixture of the components (A) and (B) and the component (C) as the crosslinking agent. The component (D) may be any known catalyst of platinum group metal or its compound, such as platinum or platinum compound. Examples of the component (D) include platinum black, platinic chloride, chloroplatinic acid, alcohol-modified chloroplatinic acid, and complexes of chloroplatinic acid and olefin, aldehyde, vinylsiloxane, or acetylene alcohol.

The component (D) should be used in an amount sufficient for it to effectively function as a catalyst. Its adequate amount may properly vary depending on the desired curing rate. An ordinary amount is 0.1 to 1,000 ppm, preferably 1 to 200 ppm, (in terms of the weight of platinum group metal) for 100% by weight of the primary constituent of the component (A) or a mixture of the components (A) and (B).

Optional Components

The addition reaction-curable organopolysilmethylenesiloxane copolymer composition of the present invention may be incorporated with optional components (or functional additives) listed below in addition to the components (A) to (D) mentioned above. Reinforcing filler, heat stabilizer, antioxidant, UV absorber, light stabilizer, conductivity imparter, adhesion imparter, colorant, slip agent, plasticizer, antistatic agent, and flame retardant may be incorporated. Their examples include: fumed silica and precipitated silica (as reinforcing filler); diatomaceous earth, graphite, aluminum oxide, mica, clay, carbon, titanium oxide, and glass beads (as filler, conductive material, pigment, and slip agent); and polydimethylsiloxane (as mold release agent). They should be added in an amount not harmful to the object and effect of the present invention.

The addition reaction-curable organopolysilmethylene-siloxane copolymer composition can be prepared by mixing the above components.

The composition can be cured by heating it at 60 to 200° C., preferably 80 to 160° C. for 10 to 480 minutes, preferably 30 to 240 minutes.

The addition reaction-curable organopolysilmethylenesiloxane copolymer composition of the present invention can give a cured product which is excellent in mechanical properties, heat resistance, electrical insulation, chemical resistance, and water resistance on account of the silmethylenesiloxane bonds contained therein.

The cured product excels also in optical properties (such as good transparency and high refractive indices), processability and moldability, and gas barrier properties (gas permeability), because it is a silicon polymer having silmethylenesiloxane copolymer bonds. Therefore, the composition is suitable for use as an LED lens and an LED sealing material that need outstanding optical properties (such as good transparency and high refractive indices), good heat resistance, and good gas barrier properties.

EXAMPLES

The invention will be described below in more detail with reference to Synthesis Examples, Examples, and Comparative Examples, which are not intended to restrict the scope thereof. Incidentally, in the following Example, "parts" means "parts by weight" and Me, Vi, and Ph denote methyl group, vinyl group, and phenyl group, respectively.

Synthesis Example 1

Synthesis of Organopolysilmethylenesiloxane Copolymer Containing Alkenyl Terminal Groups (A-1)

In xylene (200 g) were dissolved methoxy group-containing silmethylene monomer [MeO(Me)$_2$SiCH$_2$Si(Me)$_2$OMe] (153.6 g) and dimethoxydimethylsilane [MeO(Me)$_2$SiOMe] (120 g). For hydrolysis, the silmethylene monomer mixture was given dropwise at 60° C. an aqueous solution of 12N hydrochloric acid (15 g) dissolved in water (100 g). This step was followed by aging at 60° C. for three hours. The reaction product was separated from waste acid and washed with water, and finally underwent azeotropic distillation at 140° C. for dehydration. In this way, there was obtained the organopolysilmethylenesiloxane copolymer (a-1) as desired.

For introduction of alkenyl groups, the organopolysilmethylenesiloxane copolymer (a-1) (190.8 g) was reacted with 1,1,3,3-tetramethyl-1,3-divinyldisiloxane (TMDVS) (0.186 g) in the presence of an alkali polymerization catalyst (KOH) (0.2 g) at 180° C. for five hours. The reaction product was neutralized and filtered off, and finally underwent stripping for 30 minutes at 160° C. and 5 mmHg. In this way, there was obtained the organopolysilmethylenesiloxane copolymer containing alkenyl terminal groups (A-1).

Synthesis Example 2

Synthesis of Organopolysilmethylenesiloxane Copolymer Containing Alkenyl Terminal Groups (A-2)

The same procedure as in Synthesis Example 1 was repeated except that the amounts of the reactants were changed.

In xylene (200 g) were dissolved methoxy group-containing silmethylene monomer [MeO(Me)$_2$SiCH$_2$Si(Me)$_2$OMe] (230.4 g) and dimethoxydimethylsilane [MeO(Me)$_2$SiOMe] (90 g). For hydrolysis, the silmethylene monomer mixture was given dropwise at 60° C. an aqueous solution of 12N hydrochloric acid (15 g) dissolved in water (100 g). This step was followed by aging at 60° C. for three hours. The reaction product was separated from waste acid and washed with water, and finally underwent azeotropic distillation at 140° C.

for dehydration. In this way, there was obtained the organopolysilmethylenesiloxane copolymer (a-2) as desired.

For introduction of alkenyl groups, the organopolysilmethylenesiloxane copolymer (a-2) (190.8 g) was reacted with 1,1,3,3-tetramethyl-1,3-divinyldisiloxane (TMDVS) (0.127 g) in the presence of an alkali polymerization catalyst (KOH) (0.2 g) at 180° C. for five hours. The reaction product was neutralized and filtered off, and finally underwent stripping for 30 minutes at 160° C. and 5 mmHg. In this way, there was obtained the organopolysilmethylenesiloxane copolymer containing alkenyl terminal groups (A-2).

Synthesis Example 3

Synthesis of Organopolysilmethylenesiloxane Copolymer Containing Alkenyl Terminal Groups (a-3)

The same procedure as in Synthesis Example 1 was repeated except that the amounts of the reactants were changed.

In xylene (200 g) were dissolved methoxy group-containing silmethylene monomer [MeO(Me)$_2$SiCH$_2$Si(Me)$_2$OMe] (192 g) and dimethoxydimethylsilane [MeO(Me)$_2$SiOMe] (480 g). For hydrolysis, the silmethylene monomer mixture was given dropwise at 60° C. an aqueous solution of 12N hydrochloric acid (15 g) dissolved in water (100 g). This step was followed by aging at 60° C. for three hours. The reaction product was separated from waste acid and washed with water, and finally underwent azeotropic distillation at 140° C. for dehydration. In this way, there was obtained the organopolysilmethylenesiloxane copolymer (a-3) as desired.

For introduction of alkenyl groups, the organopolysilmethylenesiloxane copolymer (a-3) (190.8 g) was reacted with 1,1,3,3-tetramethyl-1,3-divinyldisiloxane (TMDVS) (0.127 g) in the presence of an alkali polymerization catalyst (KOH) (0.2 g) at 180° C. for five hours. The reaction product was neutralized and filtered off, and finally underwent stripping for 30 minutes at 160° C. and 5 mmHg. In this way, there was obtained the organopolysilmethylenesiloxane copolymer containing alkenyl terminal groups (A-3).

Synthesis Example 4

Synthesis of the Component (C-1) as a Crosslinking Agent

A mixture composed of phenyltrichlorosilane (423 parts), tetramethyldisiloxane (589.6 parts), and toluene (530 parts) was added dropwise into water (2,500 parts) over 60 minutes with vigorous stirring, followed by further stirring for 60 minutes. The mixture was washed with water until it became neutral. After dehydration with sodium sulfate, the mixture underwent distillation for separation and purification of the siloxane component (with a boiling point of 160° C. at 0.09 MPa). In this way, there was obtained the component (C-1) as a crosslinking agent.

Example 1

A composition was prepared by mixing from the following components: (A-1) organopolysilmethylenesiloxane copolymer containing alkenyl terminal groups (90 parts); vinylmethylsiloxane of resin structure (VMQ for short hereinafter), composed of 50 mol % of SiO$_2$ units, 42.5 mol % of (CH$_3$)$_3$SiO$_{0.5}$ units and 7.5 mol % of ViMe$_2$SiO$_{0.5}$ units (10 parts); (C-1) hydrogen-containing polysiloxane, with the ratio of Si—H to Si-Vi being 3 (4.5 parts); and (D-1) platinum catalyst in the form of alcohol solution of chloroplatinic acid containing 2% by weight of platinum (0.1 parts).

The resulting mixture was heated for curing at 150° C. for one hour to give a sheet. There was obtained a sheet with good transparency and a low water vapor permeability. It has the physical properties shown in Table 1.

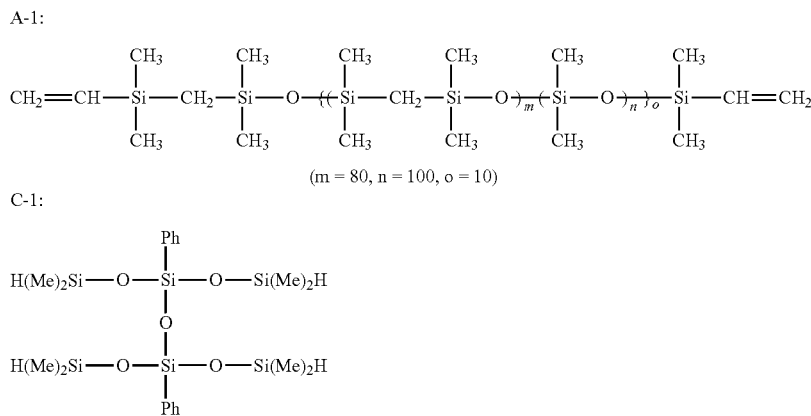

Example 2

The same procedure as in Example 1 was repeated except that the amounts of the components were changed as follows: (A-2) organopolysilmethylenesiloxane copolymer containing alkenyl terminal groups (80 parts); VMQ (20 parts); (C-1) hydrogen-containing polysiloxane, with the ratio of Si—H to Si-Vi being 3 (7.39 parts); and (D-1) platinum catalyst (0.1 parts).

The resulting mixture was heated for curing at 150° C. for one hour to give a sheet. There was obtained a sheet with good transparency and a low water vapor permeability. It has the physical properties shown in Table 1.

A-2:

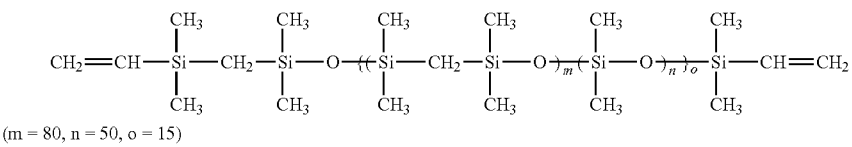

(m = 80, n = 50, o = 15)

Example 3

The same procedure as in Example 1 was repeated except that the amounts of the components were changed as follows and a new component was added: (A-2) organopolysilmethylenesiloxane copolymer containing alkenyl terminal groups (64 parts); (B-1) dimethyl-diphenylpolysiloxane copolymer containing vinyl groups at both ends [Vi(Me)$_2$SiO [SiMe$_2$O]$_{68}$(SiPh$_2$O)$_{30}$Si(Me)$_2$Vi] (16 parts); VMQ (20 parts); (C-1) hydrogen-containing polysiloxane, with the ratio of Si—H to Si-Vi being 3 (8.9 parts); and (D-1) platinum catalyst (0.1 parts).

The resulting mixture was heated for curing at 150° C. for one hour to give a sheet. There was obtained a sheet with good transparency and a low water vapor permeability. It has the physical properties shown in Table 1.

Example 4

The same procedure as in Example 1 was repeated except that the amounts of the components were changed as follows and one component was omitted: (A-3) organopolysilmethylenesiloxane copolymer containing alkenyl terminal groups (100 parts); (C-1) hydrogen-containing polysiloxane, with the ratio of Si—H to Si-Vi being 1.0 (40 parts); and (D-1) platinum catalyst (0.1 parts).

The resulting mixture was heated for curing at 150° C. for one hour to give a sheet. There was obtained a sheet with good transparency and a low water vapor permeability. It has the physical properties shown in Table 1.

A-3:

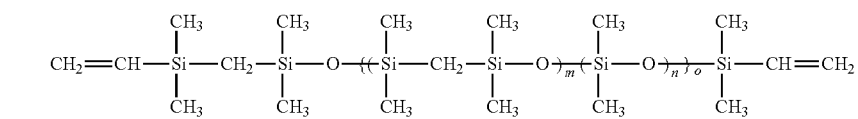

(m = 1, n = 4, o = 1)

Comparative Example 1

The same procedure as in Example 1 was repeated except that the composition was changed as follows: (B-1) dimethylsiloxane-diphenylsiloxane copolymer containing vinyl groups at both ends (80 parts); VMQ (20 parts); (C-1) hydrogen-containing polysiloxane, with the ratio of Si—H to Si-Vi being 3 (12.8 parts); and (D-1) platinum catalyst (0.1 parts).

The resulting mixture was heated for curing at 150° C. to for one hour to give a sheet. There was obtained a sheet with good transparency and a low water vapor permeability. It has the physical properties shown in Table 1.

TABLE 1

| Properties after curing | Example | | | | Comparative Example |
|---|---|---|---|---|---|
| | 1 | 2 | 3 | 4 | 1 |
| Appearance | Colorless transparent | Colorless transparent | Colorless transparent | Colorless transparent | Colorless transparent |
| Hardness (Type A) | 30 | 40 | 50 | 80 | 40 |
| Tensile strength (MPa) | 3 | 3 | 2 | 0.2 | 0.3 |
| Elongation (%) | 300 | 200 | 300 | 15 | 150 |
| Density | 1.07 | 1.07 | 1.07 | 1.07 | 1.06 |
| Water vapor permeability (g/m$^2$ · 24 hr) | 22 | 21 | 15 | 10 | 45 |

Japanese Patent Application No. 2011-042758 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An addition reaction-curable organopolysilmethylenesiloxane copolymer composition comprising:

(A) an organopolysilmethylenesiloxane copolymer in an amount of 1 to 100% by weight, which is represented by formula (a) shown below:

(a)

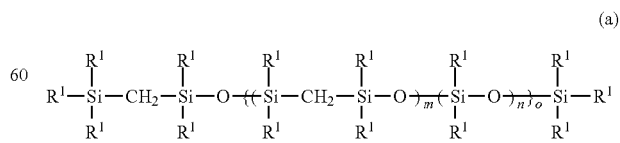

wherein R$^1$ is independently selected from an unsubstituted or substituted monovalent hydrocarbon group with a carbon number of 1 to 10, alkoxyl group, hydroxyl group, halogen atom, $(R^{O1})_3SiCH_2—$, and $(R^{O1})_3SiO—$ in which $R^{O1}$ is independently selected from an unsubstituted or substituted monovalent hydrocarbon group with a carbon number of 1 to 10, and m is 1 to 100, n is 3 to 1,000, and o is 1 to 20, the organopolysilmethylenesiloxane copolymer having in one molecule at least two alkenyl groups bonding to silicon atoms;

(B) an organopolysiloxane in an amount of 0 to 99% by weight, which is represented by the average compositional formula (b) shown below:

wherein $R^2$ is independently selected from an unsubstituted or substituted monovalent hydrocarbon group with a carbon number of 1 to 10, alkoxyl group, hydroxyl group, and halogen atom, and a is a number satisfying $0.7 \leq a \leq 3.0$, the organopolysiloxane having in one molecule at least two alkenyl groups bonding to silicon atoms;

the total amount of components (A) and (B) being 100% by weight, (C) an organohydrogenpolysilmethylenesiloxane and/or organohydrogenpolysiloxane as a crosslinking agent which has in one molecule at least two hydrogen atoms bonding to silicon atoms, said crosslinking agent being in such an amount that the hydrogen atoms bonding to silicon atoms in this component (C) accounts for 0.1 to 5.0 mol per mol of all alkenyl groups in the addition reaction-curable organopolysilmethylenesiloxane copolymer composition; and (D) a platinum group metal-based catalyst in an effective amount.

2. The addition reaction-curable organopolysilmethylenesiloxane copolymer composition of claim 1, wherein formula (a) representing the component (A) is defined such that each of $R^1$ is one which is independently selected from an unsubstituted or substituted monovalent hydrocarbon group with a carbon number of 1 to 10, $(R^{O1})_3SiCH_2—$, and $(R^{O1})_3SiO—$ in which $R^{O1}$ is defined in claim 1.

3. The addition reaction-curable organopolysilmethylenesiloxane copolymer composition of claim 1 or 2, wherein the crosslinking agent as the component (C) is one which is selected from:

(C1) an organohydrogenpolysilmethylenesiloxane represented by formula (c1) shown below:

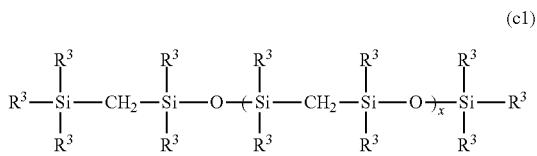

wherein $R^3$ is independently selected from a monovalent hydrocarbon group with a carbon number of 1 to 10, hydrogen atom, $(R^{O3})_3SiCH_2—$ group, and $(R^{O3})_3SiO—$ group in which $R^{O3}$ is independently selected from a monovalent hydrocarbon group with a carbon number of 1 to 10, and x is 0 to 100, the organohydrogenpolysilmethylenesiloxane having in one molecule at least two hydrogen atoms bonding to silicon atoms; and (C2) an organohydrogenpolysiloxane represented by the average compositional formula (c2) shown below:

wherein $R^4$ is independently selected from a monovalent hydrocarbon group with a carbon number of 1 to 10, hydrogen atom, alkoxyl group, hydroxyl group, and halogen atom, and b and c are positive numbers satisfying $0.7 \leq b \leq 2.1$, $0.001 \leq c \leq 1.0$, and $0.8 \leq b+c \leq 3.0$, the organohydrogenpolysiloxane having in one molecule at least two hydrogen atoms bonding to silicon atoms.

4. The addition reaction-curable organopolysilmethylenesiloxane copolymer composition of claim 3, wherein the component (C2) is an organohydrogenpolysiloxane represented by formula (c2') shown below:

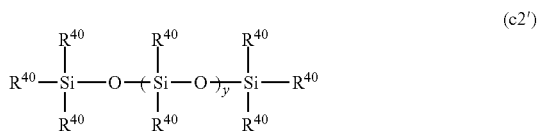

wherein $R^{40}$ denotes a monovalent hydrocarbon group with a carbon number of 1 to 6, hydrogen atom, alkoxyl group, hydroxyl group, halogen atom, and $(R^{O40})_3SiO—$ in which $R^{O40}$ is independently selected from a monovalent hydrocarbon group with a carbon number of 1 to 6, and y is 0 to 50, the organohydrogenpolysiloxane having in one molecule at least two hydrogen atoms bonding to silicon atoms.

5. The addition reaction-curable organopolysilmethylenesiloxane copolymer composition of claim 1, comprising:

(A) an organopolysilmethylenesiloxane copolymer in an amount of 60 to 100% by weight, which is represented by formula (a') shown below:

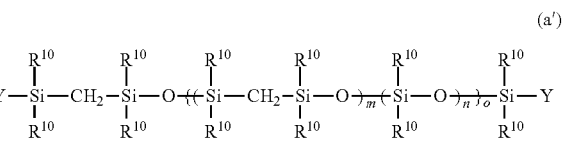

wherein $R^{10}$ is selected from $Y(CH_3)_2SiCH_2—$ and $Y(CH_3)_2SiO—$, with Y being a vinyl group, m is 1 to 100, n is 3 to 1,000, and o is 1 to 20, the organopolysilmethylenesiloxane copolymer having in one molecule at least two vinyl groups bonding to silicon atoms;

(B) an organopolysiloxane in an amount of 0 to 40% by weight, which is represented by the average compositional formula (b) shown below:

wherein $R^2$ is independently selected from an unsubstituted or substituted monovalent hydrocarbon group with a carbon number of 1 to 10, alkoxyl group, hydroxyl group, and halogen atom, and a is a number satisfying $0.7 \leq a \leq 3.0$, the organopolysiloxane having in one molecule at least two vinyl groups bonding to silicon atoms;

the total amount of components (A) and (B) being 100% by weight, (C) an organohydrogenpolysilmethylenesiloxane and/or organohydrogenpolysiloxane selected from:

(C1) an organohydrogenpolysilmethylenesiloxane which is represented by formula (c1) shown below:

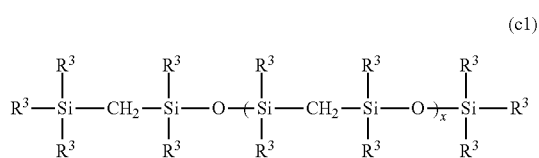

(c1)

wherein $R^3$ is independently selected from a monovalent hydrocarbon group with a carbon number of 1 to 10, hydrogen atom, $(R^{O3})_3SiCH_2$— group, and $(R^{O3})_3SiO$— group in which $R^{O3}$ is independently selected from a monovalent hydrocarbon group with a carbon number of 1 to 10, and x is 0 to 100, the organohydrogenpolysilmethylenesiloxane having in one molecule at least two hydrogen atoms bonding to silicon atoms; and (C2) an organohydrogenpolysiloxane which is represented by formula (c2') shown below:

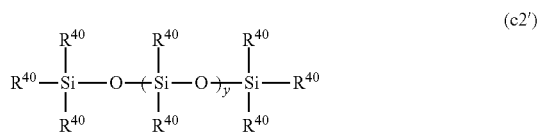

(c2')

wherein $R^{40}$ is independently selected from a monovalent hydrocarbon group with a carbon number of 1 to 6, hydrogen atom, alkoxyl group, hydroxyl group, halogen atom, and $(R^{O40})_3SiO$— in which $R^{O40}$ is independently selected from a monovalent hydrocarbon group with a carbon number of 1 to 6, and y is 0 to 50, the organohydrogenpolysiloxane having in one molecule at least two hydrogen atoms bonding to the silicon atom, said components (C1) and/or (C2) being in such an amount that the hydrogen atoms bonding to silicon atoms in this component (C) accounts for 0.1 to 5.0 mol per mol of all alkenyl groups in the addition reaction-curable organopolysilmethylenesiloxane copolymer composition; and (D) a platinum group metal-based catalyst in an effective amount.

6. The addition reaction-curable organopolysilmethylenesiloxane copolymer composition of claim 1, wherein m is 30 to 100, n is 3 to 300, and o is 5 to 15.

7. The addition reaction-curable organopolysilmethylenesiloxane copolymer composition of claim 1, wherein m is 50 to 100, n is 3 to 100, and o is 5 to 15.

8. The addition reaction-curable organopolysilmethylenesiloxane copolymer composition of claim 6, wherein n is 50 to 300.

9. The addition reaction-curable organopolysilmethylenesiloxane copolymer composition of claim 1, wherein component (B) is an organopolysiloxane resin represented by the formula (b')

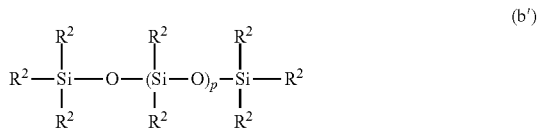

(b')

in which: each $R^2$ is independently selected from an unsubstituted or substituted monovalent hydrocarbon group with a carbon number of 1 to 10, an alkoxyl group, hydroxyl group, and a halogen atom; and p is 0 to 100.

10. The addition reaction-curable organopolysilmethylenesiloxane copolymer composition of claim 1, wherein component (D) is a member selected from the group consisting of platinum black, platinic chloride, chloroplatinic acid, alcohol-modified chloroplatinic acid, and complexes of chloroplatinic acid with olefins, aldehydes, vinylsiloxanes, or acetylene alcohols.

* * * * *